United States Patent
Brown

(10) Patent No.: US 9,042,413 B1
(45) Date of Patent: May 26, 2015

(54) Q-SWITCHED MILLIMETER-WAVE SMASER

(71) Applicant: Robert G. Brown, Tustin, CA (US)

(72) Inventor: Robert G. Brown, Tustin, CA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 26 days.

(21) Appl. No.: 13/862,275

(22) Filed: Apr. 12, 2013

(51) Int. Cl.
*H01S 1/02* (2006.01)
*H01S 4/00* (2006.01)
*H01S 3/11* (2006.01)

(52) U.S. Cl.
CPC ... *H01S 1/02* (2013.01); *H01S 4/00* (2013.01); *H01S 3/11* (2013.01)

(58) Field of Classification Search
CPC ....... H01S 3/11; H01S 3/1115; H01S 3/1118; H01S 3/115; H01S 3/117; H01S 3/121; H01S 3/127; H01S 1/005; H01S 1/06; H01S 4/00; H01S 1/02
USPC ....................................... 372/10, 4
See application file for complete search history.

(56) References Cited

U.S. PATENT DOCUMENTS

| | | | | |
|---|---|---|---|---|
| 3,405,372 A * | 10/1968 | Brecher et al. | ................. | 372/52 |
| 6,078,606 A * | 6/2000 | Naiman et al. | ................. | 372/97 |
| 6,400,495 B1 * | 6/2002 | Zayhowski | ................. | 359/333 |
| 2008/0259975 A1 * | 10/2008 | Kamijima | ................. | 372/23 |
| 2011/0222562 A1 * | 9/2011 | Jiang et al. | ................. | 372/6 |

* cited by examiner

*Primary Examiner* — Xinning Niu
(74) *Attorney, Agent, or Firm* — Angel N. Gerdzhikov; Donna P. Suchy; Daniel M. Barbieri

(57) ABSTRACT

A pulsed smaser includes at least one optical resonator and an optical pump. The at least one optical resonator includes opposing mirrors, a solid state gain medium having a masing frequency in a range of from about 50 GHz to about 1 THz, and a Q-switch, wherein the solid state gain medium and the Q-switch are optically arranged between the opposing mirrors. The optical pump is arranged to provide optical pump power to the solid state gain medium. The optical pump and the Q-switch are configured to generate pulsed masing in the solid state gain medium at the masing frequency at room temperature to provide output electromagnetic radiation at the masing frequency.

19 Claims, 3 Drawing Sheets

Q-SWITCHED MILLIMETER-WAVE SMASER

The present application relates to a maser emitting electromagnetic radiation at sub millimeter wavelengths, i.e., a smaser. More specifically, the application relates to a Q-switched solid state smaser operating at room temperature.

BACKGROUND

Solid state masers, where the maser gain medium is in solid state form are known. Typically, however, such solid state masers require operation in the ultra low temperature regime. Ruby has been used as a solid state gain medium for a solid state medium operating at about 60° K [C. R. Ditchfield and P. A. Forrester, 'Maser action in the region of 60° K' Phys. Rev. Letts., 1, p 448 (1958)].

More recently, organic masers have been demonstrated at room temperature by Oxborrow et al. [M. Oxborrow, J. D. Breeze and N. M. Alford, 'Room-temperature solid-state maser', Nature, 488, pp 353-356 (2012)]. The power output for such an organic maser was only −10 dBm at a masing frequency of 1.45 GHz.

SUMMARY OF THE INVENTION

According to one embodiment, there is provided a pulsed smaser, comprising: at least one optical resonator comprising: opposing mirrors; a solid state gain medium having a masing frequency in a range of from about 50 GHz to about 1 THz; and a Q-switch, wherein the solid state gain medium and the Q-switch are optically arranged between the opposing mirrors; and an optical pump arranged to provide optical pump power to the solid state gain medium, wherein the optical pump and the Q-switch are configured to generate pulsed masing in the solid state gain medium at the masing frequency at room temperature to provide output electromagnetic radiation at the masing frequency.

According to an aspect of the embodiment, the output electromagnetic radiation at the masing frequency has a peak power of about $1 \times 10^7$ Watts to about $1 \times 10^9$ Watts with a pulse width time duration of about 7 nanoseconds seconds.

According to another aspect of the embodiment, the solid state gain medium comprises at least one material selected from the group consisting of emerald, ruby, sapphire, titania, magnesium tungstate, zinc fluorite and yttrium oxide.

According to another aspect of the embodiment, the solid state gain medium is doped with at least one dopant ion from the group consisting of Gd, Cr, Ni, Fe, V and N.

According to another aspect of the embodiment, the optical pump comprises a plurality of lasers.

According to another aspect of the embodiment, the plurality of lasers comprise at least one of solid lasers, liquid lasers, gas lasers, laser-diodes, or light emitting diodes.

According to another aspect of the embodiment, the Q-switch is configured to provide Q-switching or mode-locking such that the output electromagnetic radiation has a pulse time in the pico-second to micro-second range.

According to another aspect of the embodiment, the Q-switch comprises a saturable-absorber material.

According to another aspect of the embodiment, the saturable-absorber material comprises at least one of graphene, graphane or carbon nano-tubes dispersed in a liquid-crystal.

According to another aspect of the embodiment, the output electromagnetic radiation is output in a $TEM_{00}$ mode.

According to another aspect of the embodiment, the smaser further comprises a cooling element configured to cool the at least one solid state gain medium.

According to another aspect of the embodiment, the cooling element is configured to provide air cooling or liquid cooling.

According to another aspect of the embodiment, the cooling element comprises one or more heat dissipating fins.

According to another aspect of the embodiment, the at least one resonator comprises a plurality of resonators.

According to another aspect of the embodiment, an optical assembly comprises: the smaser; and an optical element arranged to receive output electromagnetic radiation from the smaser.

According to another aspect of the embodiment, the optical element comprises at least one of a lens or mirror arranged to expand and then focus the output electromagnetic radiation.

According to another aspect of the embodiment, the optical element comprises at least one of an afocal lens or an afocal mirror.

According to another aspect of the embodiment, the Q-switch comprises at least one of an acousto-optic Q switch, an electro-optic Q switch, a mechanical Q switch, or a passive Q-switch.

According to another embodiment, there is provided a continuous wave smaser, comprising: at least one optical resonator comprising: opposing mirrors; and a solid state gain medium having a lasing frequency in a range of from about 50 GHz to about 1 THz; and an optical pump arranged to provide optical pump power to the solid state gain medium, wherein the optical pump is configured to generate pulsed masing in the solid state gain medium at the masing frequency at room temperature to provide output electromagnetic radiation at the masing frequency

BRIEF DESCRIPTION OF THE DRAWINGS

These and other features, aspects, and advantages of the present disclosure will become apparent from the following description, appended claims, and the accompanying exemplary embodiments shown in the drawings, which are briefly described below, wherein like numerals denote like elements.

DETAILED DESCRIPTION

According to embodiments of the present invention, a smaser (a maser emitting electromagnetic radiation at sub millimeter wavelengths) is described which produces high peak power pulses at sub-mm wavelengths when operated at room temperature (300° K), A peak output of ~$1.3 \times 10^8$ Watts with a pulse width time duration around 7.5 nanoseconds is calculated for the smaser. The high power smaser is achieved by Q-switching, and including a solid state gain medium having a lasing frequency of from about 50 GHz to about 1 THz.

Figure 1:
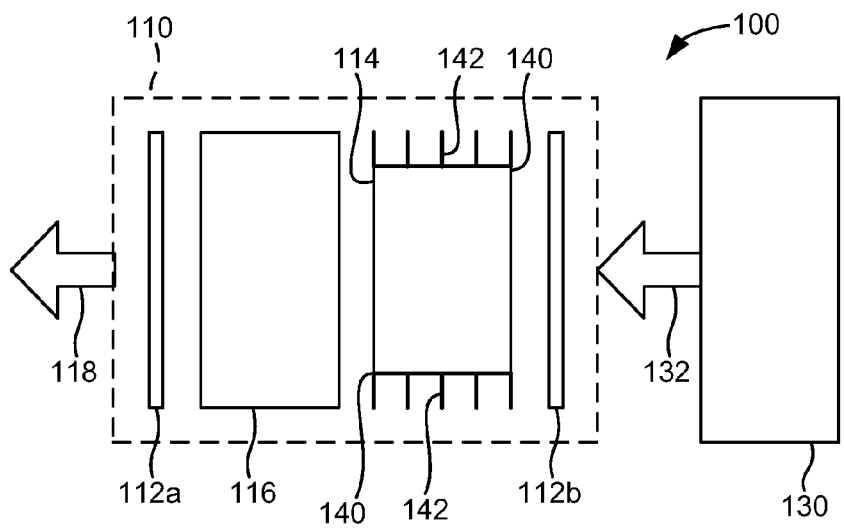
FIG. 1 is a schematic of a pulsed smaser according to an exemplary embodiment.

FIG. 1 is a schematic illustrating a pulsed smaser 100 according to an embodiment of the invention. The pulsed smaser 100 includes an optical resonator 110, and an optical pump 130. While FIG. 1 illustrates the smaser 100 having a single optical resonator 110, in practice the smaser 100 may have more than one optical resonator 110.

The optical resonator includes opposing mirrors 112a and 112b, solid state gain medium 114, and Q-switch 116. The solid state gain medium 114 and Q-switch 116 are optically arranged between the opposing mirrors 112a and 112b such that electromagnetic radiation reflecting between the mirrors 112a and 112b passes through the solid state gain medium 114 and Q-switch 116.

The solid state gain medium 114 has a lasing frequency of from about 50 GHz to about 1 THz. The solid state gain medium 114 may be, for example, emerald, ruby, sapphire, titania, magnesium tungstate, zinc fluorite or yttrium oxide. The solid state gain medium 114 may be doped. For example, the solid state gain medium 114 may be doped with at least one dopant ion where the dopant ion may be Gd, Cr, Ni, Fe, V or N, for example. The solid state gain medium 114 may have a geometry such that output electromagnetic radiation 118 from the smaser 100 is output in a $TEM_{00}$ mode.

The Q-switch 116 may be configured to provide Q-switching or mode-locking such that the output electromagnetic radiation has a pulse time in the pico-second to micro-second range. Compared to mode-locking, Q-switching leads to much lower pulse repetition rates, much higher pulse energies, and much longer pulse durations. The Q-switch 116 may include a saturable-absorber material, for example. The saturable-absorber material may be at least one of graphene, graphane or carbon nano-tubes dispersed in a liquid-crystal, for example.

The optical pump 130 is arranged to provide optical pump power to the solid state gain medium. The optical pump 130 may comprise one or a plurality of lasers. The lasers of the optical pump 130 may be, for example, one or more solid lasers, liquid lasers, gas lasers, laser-diodes, or light emitting diodes. The optical pump 130 and the Q-switch 116 are configured to generate pulsed masing in the solid state gain medium 114 at the masing frequency at room temperature to provide the output electromagnetic radiation 118 at the masing frequency of the solid state gain medium 114.

The optical pump 130 may pump at radiation frequencies close to the emission frequency of the solid state gain medium 114 for efficiency purposes. For example, the optical pump 130 may pump at frequencies within a factor 2× or so of the main emission frequency of the solid state gain medium 114, if a suitable absorption line exists to do this, by beating optical lasers together inside the smaser cavity such that the beat-frequency is one that can be absorbed at energy levels just above the emission energy level.

The smaser 100 may further include a cooling element 140 configured to cool at least one solid state gain medium 114. The cooling element 140 may be configured to provide air cooling or liquid cooling, or example. The cooling element 140 comprises one or more heat dissipating fins 142. The cooling element 140 may comprise one or more fans. The cooling element may comprise a material having a high thermal conductivity contacting the solid state gain medium 114, such as sapphire, for example.

FIG. 1 illustrates a smaser 100 which is pulsed. Alternatively, the smaser may be a continuous wave smaser, without the Q-switch 116.

Q-Switch

A Q-switch is a device which can be quickly switched between states where it causes very low or rather high losses, respectively, for an electromagnetic radiation beam sent through the switch. Such Q-switch devices are typically used within a laser resonator with the purpose of active Q-switching the maser, where this is a technique for generating short intense pulses, where the pulse duration is typically in the nanosecond range.

Figure 2:
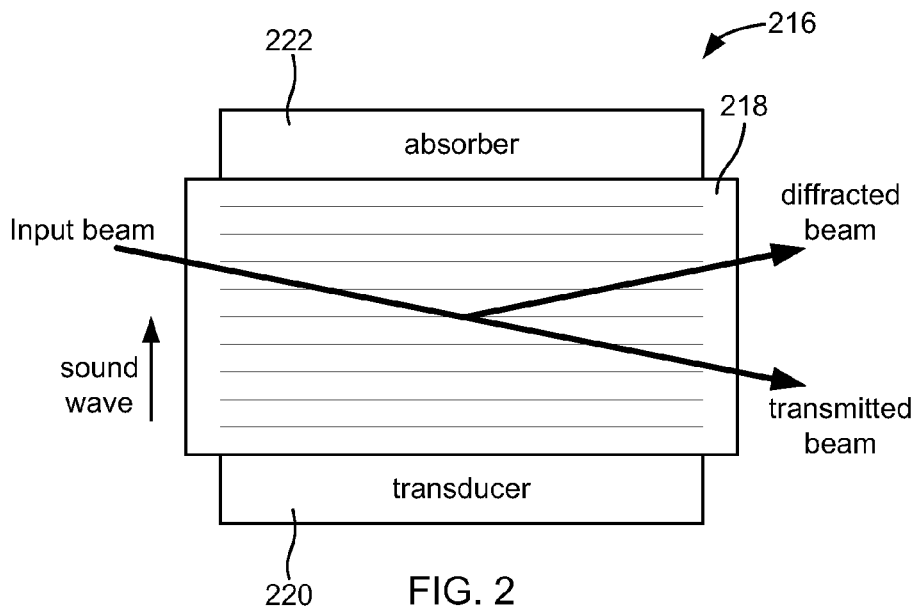
FIG. 2 is a schematic of an acousto-optic modular for use as a Q-switch for the smaser of FIG. 1.

The Q-switch 116 may be, for example, an acousto-optic Q-switch, such as an acousto-optic modulator, for example. FIG. 2 is a schematic illustrating an acousto-optic modulator 216 according to an embodiment of the invention. The acousto-optic modulator 216 has a transducer 220, and absorber 222, with an acoustic wave medium 218 between the transducer 220, and the absorber 222. The transducer 220 may generate an acoustic wave. Electromagnetic radiation in an input beam is passed through the acoustic wave medium 218. When the transducer 220 generates the acoustic wave, the input beam is partially diffracted and splits into a diffracted beam and a transmitted beam.

Alternatively, the Q-switch 116 may be an electro-optic Q-switch, where the polarization state of electromagnetic radiation can be modified via the electro-optic effect, a mechanical switch, or a passive Q-switch. Passive Q-switches are saturable absorbers which are triggered by the electromagnetic radiation itself passing through the saturable absorber. The losses introduced by the Q-switch in this case must be small enough to be overcome by the laser gain once sufficient energy is stored in the gain medium. The maser power then first rises relatively slowly, and once it reaches a certain level the absorber is saturated, so that the losses drop, the net gain increases, and the maser power can sharply rise to form a short pulse.

The selection of a Q-switch will depend upon the particular application. The following parameters may be considered, the operation wavelength, which influences e.g. the required anti-reflection coating, the open aperture, the losses in the high-loss state (particularly for high gain lasers), low-loss state (influencing the power efficiency), the switching speed (particularly for short pulse lasers), the damage threshold intensity, the required RF power, the cooling requirements, the size of the setup (particularly for compact lasers). Furthermore, the electronic driver must be selected to fit to the Q switch.

Figure 3:
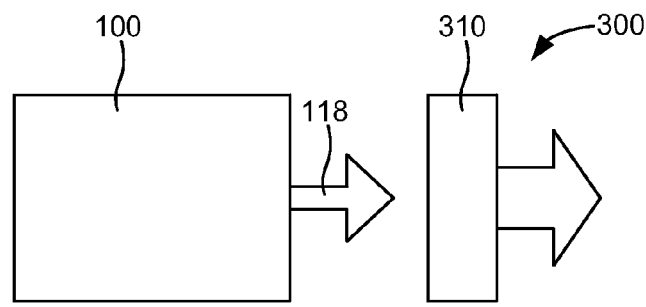
FIG. 3 is a schematic of an optical assembly according to an exemplary embodiment.

FIG. 3 is a schematic illustrating an optical assembly 300 according to an embodiment of the invention. The optical assembly 300 includes a smaser 100, such as the smaser 100 described with respect to FIG. 1, and an optical element 310. The optical element 310 is arranged to receive the output electromagnetic radiation 118 from the smaser 100. The optical element 310 may have at least one of a lens or mirror arranged to expand and then focus the output electromagnetic radiation 118, for example. The optical element 310 may be an afocal lens or an afocal mirror, for example.

Mathematics for Q-Switching and Pulse Maser Power Output

The mathematics for Q-switching and the pulse maser are described below for calculating the pulse maser power output.

The maser material (gain medium) is characterized by the following parameters: $N_o$, the number of active ions in the volume element, $\tau_L$, the lifetime of spontaneous (fluorescent) decay, and $\alpha_o$, the absorption coefficient of the unexcited maser material. The parameter $\alpha_o$ is a function of the frequency, where the peak value at the center of the fluorescent line is taken as the parameter $\alpha_o$ value.

The maser geometry is characterized by the following variables: V, the volume of the maser material, l, the length of the maser material, and L, the optical distance between the reflectors (mirrors) calculated while taking into account the refractive indices of the materials situated between reflectors.

The physical state of the maser is characterized by the following variables: $\phi$, the photon density at the masing frequency $\nu$, and $N=N_2-N_1$, the population inversion per unit volume, where $N_1$ is the population per unit volume of the ground energy level and the $N_2$ is the population per unit volume of the excited energy level.

An important device parameter is the loss coefficient $\gamma$, which is the fractional photon loss in a single passage between the reflectors. The loss coefficient $\gamma$ may be subdivided as $\gamma=\gamma_1+\gamma_2$, where $\gamma_1$ represents the fraction of photons emitted as useful output of the device and $\gamma_2$ represents incidental losses.

The time of a single passage of a photon is $t_1=L/c$, where c is the speed of light. Therefore, the lifetime of a photon within the Fabry-Perot interferometer of the maser cavity, i.e., the region between the cavity mirrors, is $T=t_1/\gamma$. This is a fundamental unit of time characteristic of the maser.

The initial state for the formation of the pulse is achieved by pumping the maser with an optical source and keeping the loss coefficient at a value $\gamma'$ much higher than $\gamma$. During this period of excitation, the population inversion rises from $-N_o$ to a positive value $N_i$, and the photon density also rises to a value $\phi_i$, where the subscript i indicates that the values are "initial" values for the pulse. At time t=0 the loss coefficient is reduced to $\gamma$ and the formation of the pulse begins.

Photons are amplified in the maser at the rate of $\phi\alpha x$ on traversing a distance x in the active gain material (gain medium). Here $\alpha$, the coefficient of amplification, satisfies the equation $\alpha=\alpha_o\, N/N_o$. The full length of the maser is traversed $l/t_1$ times per second.

If $n_p$ is the population inversion that corresponds to the threshold for the given maser, then $\alpha_o \ln_p=\gamma$.

At the start of the process for the formation of the pulse, the photon density $\phi$ is very low. It rises from $\phi_i$, and reaches a peak $\phi_p$, which is generally many orders of magnitude higher than $\phi_i$. Then $\phi$ declines to zero because of the exhaustion of its source of energy supplied due to the population inversion. The population inversion is a monotonically decreasing function of time starting at $n_i$ and ending at $n_f$.

Figure 4:
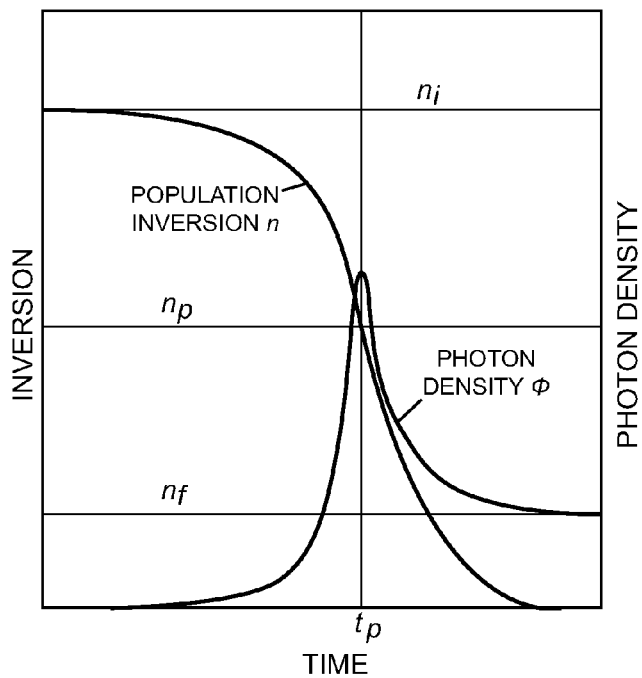
FIG. 4 is a graph illustrating population inversion and photon density with time.

FIG. 4 is a graph illustrating the typical curves traced out by these variables of n and $\phi$.

The total energy obtainable from the pulse is proportional to $n_i-n_f$, and the peak power radiated is proportional to the peak photon density $\phi_p$. The total energy and peak power are of prime interest; and may be calculated in terms of the initial values $n_i$ and $\phi_i$. The maser itself is characterized by the parameters T and $n_p$, and further $N_o$ and $\upsilon$ if a variation of materials is contemplated.

Figure 5:
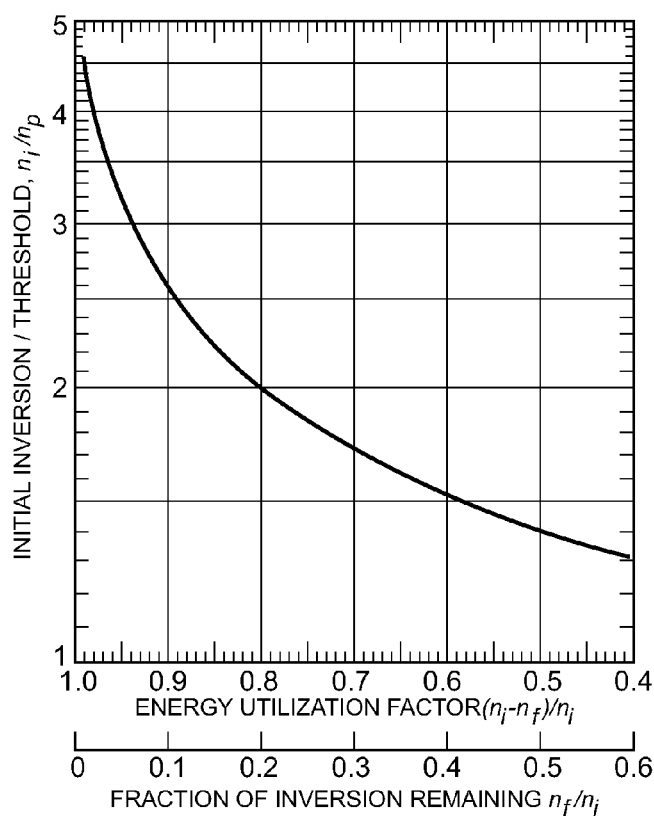
FIG. 5 is a graph illustrating energy utilization factor and inversion.

FIG. 5 is a graph illustrating the relationship between $n_f/n_i$ and $n_i/n_p$ as determined from $\beta=(\log(x))/(x-1)$, where $x=n_f/n_i$ and $\beta=(\log(x))/(x-1)$. The graph allows the determination of the fraction of the inversion remaining from the initial conditions. The energy utilization factor is given as $(n_f-n_i)/n_i$.

The total energy output of the pulse is given as:

$$E=\tfrac{1}{2}(n_f-n_i)VN_o h\upsilon \qquad \text{Equation 1}$$

The peak power may be calculated noting that the peak is reached when $n=n_p$. After some manipulation the peak power, $W_p$, radiated from the maser is:

$$W_p=\tfrac{1}{2}[n_p \log(n_p/n_i)+n_i-n_p](VN_o h\upsilon/T) \qquad \text{Equation 2,}$$

where the photon-lifetime is T, defined above, and h is Planck's constant. For a reasonable example of Q-switching, taking $n_i=0.15$ and $n_p=0.05$, it can be seen from FIG. 5 that $n_f/n_i=0.06$ and the energy utilization factor is ~94%.

Further, the Q-switched pulse-width is well approximated by dividing the total pulse energy by the peak pulse power i.e., $E/W_p$.

Maser Parameter Design

In designing a maser for Q-switching for delivering a ~mm wave coherent beam, the parameters for calculating the peak power, $W_p$ from Equation 2 may be examined. As can be seen in FIG. 2, the peak power, $W_p$, radiated from the maser is, apart from the values of the n terms, proportional to the parameters V, the volume of the maser cavity, $N_o$, the number of active atoms/ions per unit volume contributing to laser cavity Q-switching process, $\upsilon$, the frequency of the electromagnetic radiation output by the maser, and T, the photon-lifetime; which is typically similar in both lasers and masers, on the order of about $10^{-8}$ seconds.

V may be made large by having a long cavity, while keeping it narrow to maintain lowest order $TEM_{00}$ Gaussian-beam mode, which focusses to the smallest spot or beam-diameter.

Regarding $N_o$, in a molecular gas this might be ~6 orders of magnitude less than in a solid, as shown as follows. In a molecular gas such as $NH_3$ used for maser action at 23.86 GHz, at a pressure of say 300 milli-Torr, the gas equation PV=kNT, where P is pressure, T is now temperature in °K, V is volume, k is Boltzmann's constant and N is the number-density of gas-molecules, may be used to calculate N, and estimate $N_o$. At 27° K, $N=7.25\times10^{13}$ molecules per cc.

Thus, looking at equation 2, it can be seen that changing the masing material from a gas to a solid state material to increase $N_o$, and increasing the frequency $\upsilon$, can have a dramatic effect on peak output power.

Effect of Temperature and Operational Masing Frequency on Masing

The strength of the maser action in a maser crystal is proportional to the difference $n_i-n_j$ between the populations of the two signal levels, the ground and excited energy levels, of the gain medium. The negative population difference at the signal frequency with the optical pump on is of the same order of magnitude as the population difference at thermal equilibrium with the pump off. The latter quantity is determined by the Boltzmann ratio $\exp(-hf_{ij}/kT)$, where $f_{ij}$ is the frequency difference between the levels, i.e, the masing frequency. If the temperature is high, then $hf_{ij}/kT\ll1$, and so the populations are nearly equal and the population difference will be small. With $f_{ij}$ in the microwave range of a few GHz, at room temperature, then the population difference is very small, ~1 in $10^4$, and a substantial difference in population difference can only be achieved by cooling, typically to liquid-helium temperatures of ~4° K The situation for a greater masing frequency with a masing wavelength in the mm range is different. Table 1 illustrates the Boltzmann population ratio (exp term) and population difference for temperatures of 4° K and 300° K (room temperature) for different masing frequencies.

TABLE 1

Boltzmann Maser Population Ratios and Differences.

| | Boltzmann Maser Population Ratios and Differences | | | |
|---|---|---|---|---|
| | T = 4K | | T = 300K | |
| | exp term | difference | exp term | difference |
| 3 GHz | 0.965 | 0.035 | 0.9995 | 0.0005 |
| 9 GHz | 0.898 | 0.102 | 0.999 | 0.001 |
| 24 GHz | 0.75 | 0.25 | 0.996 | 0.004 |
| 94 GHz | 0.324 | 0.676 | 0.985 | 0.015 |
| 200 GHz | 0.091 | 0.909 | 0.968 | 0.032 |
| 240 GHz | 0.056 | 0.944 | 0.962 | 0.038 |

As can be seen in Table 1, by raising the operating frequency (masing frequency) well above the normal maser operating frequencies of a few GHz to some 10 s of GHz, when a frequency of 200 GHz to 240 GHz is reached, the same population ratios and differences are reached at room temperature that require 4° K temperatures for the lower microwave frequency of 3 GHz. Thus, cooling of the gain medium is not needed at 200 GHz to 240 GHz frequencies to achieve similar population inversion values as that achieved at 3 GHz at 4° K.

Moreover, the high frequency lasing greatly increases the peak output power based on the Q-switching as can be from Equation 2.

Further by employing a solid state gain medium in place of a gas, the peak output power also greatly increases as can be seen from Equation 2, as $N_o$, the number of active ions in the volume element, is many orders-of magnitude greater in solids than gases.

Maser Materials for 50 GHz to 1 THz Operation

Solid State gain medium materials in the 50 GHz to 1 THz are now contemplated. Based on calculations of the masing frequency, the following materials are as follows: Yttrium Oxide, $Y_2O_3$, with $Cr^{3+}$ ions, operating at 72.7 GHz, Zinc Fluorite, $ZnF_2$, with $Ni^{2+}$ ions, operating at 80, 86 or 166 GHz, Magnesium Tungstate, with $Fe^{3+}$ ions, operating at 137.2 GHz, Sapphire, $Al_2O_3$, with $V^{3+}$ ions, operating at 210 to 230 GHz, Titania, $TiO_2$ with $N^{2+}$ ions, operating at 124.6 ($Fe^{3+}$ ions) or 250 GHz.

Here it is assumed that at least $\sim 3*10^{19}$ ion spins per cc is possible in the material chosen for the gain medium.

Peak Output Power for Sample Q-Switched Smaser System

A smaser system is now described where the peak output power is calculated.

Figure 6:
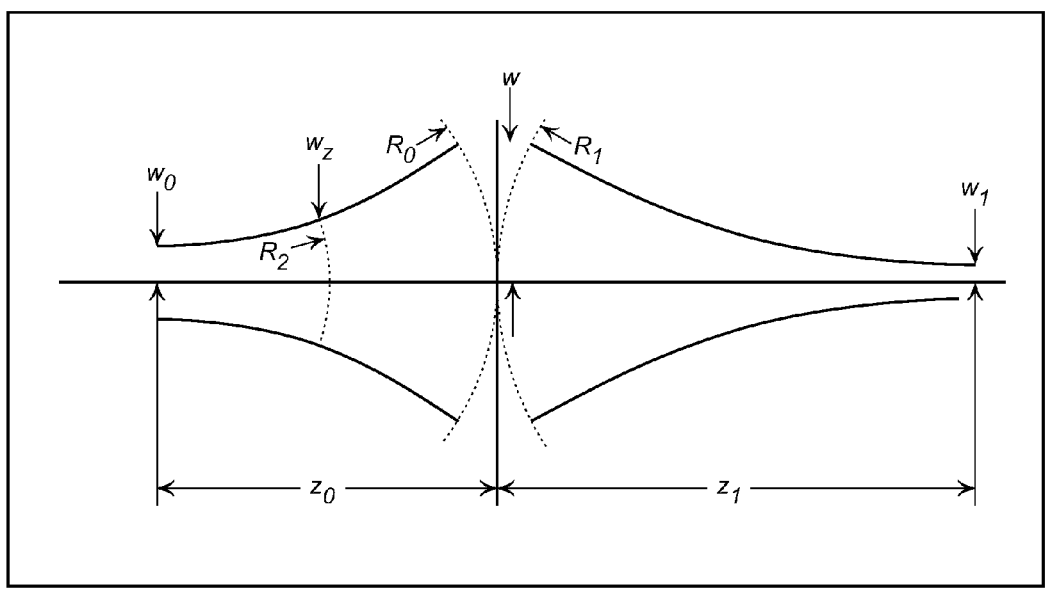
FIG. 6 is a schematic for calculating the beam waist size of the smaser.

The smaser cavity is of circular cross-section. In this case, Kogelnik-Li equations [H. Kogelnik and T. Li, '*Laser beams and resonators*', Proc. IEEE, 54, p 1312 (1966).] may be used for the $TEM_{00}$ mode, as set out with respect to FIG. 6 in order to calculate the smallest beam waist that the maser can be focused into at some desired range.

The Kogelnik-Li equations provide:

Beam radius $w_z$ at distance z is $$w_z = \sqrt{w_0^2 \left[1 + \left(\frac{\lambda z}{\pi w_0^2}\right)^2\right]} \approx \frac{\lambda z}{\pi w_0}$$

Radius of curvature of wavefront $R_z$ is $$R_z = z\left[1 + \left(\frac{\pi w_0^2}{\lambda z}\right)^2\right] \approx z$$

Axial position of waist $w_1$ $$z_1 = f + \frac{(z_0 - f)f^2}{(z_0 - f)^2 + \left(\frac{\pi w_0^2}{\lambda}\right)^2}$$

Radius of waist $w_1$ $$w_1 = \frac{w_0 f}{\sqrt{(z_0 - f)^2 + \left(\frac{\pi w_0^2}{\lambda}\right)^2}}$$

from which the beam waist may be calculated.

Further, the system employs optical-pumping of a 3-level smaser system in the solid state gain medium. Such pumping may be accomplished using near infrared laser diodes, for example.

The operating frequency (masing frequency) of the system is about 250 GHz, and thus Sapphire, $Al_2O_3$, with $V^{3+}$ ions or Titania, $TiO_2$ with $N^{2+}$ ions, may be chosen as the gain medium, where the gain medium length is 30 cm and the gain medium diameter is 2.5 cm. Further, a value of $25 \times 10^{19}$ ions per cc for the gain medium is presumed for the system. In this case, a spontaneous lifetime of the gain material is calculated to be $\sim 3 \times 10^5$ seconds and the stimulated photon lifetime to be $\sim 2 \times 10^{-9}$ seconds, via the equation: spontaneous lifetime= $(3 \cdot h \cdot c^3)/(64 \cdot \pi^4 \cdot \upsilon^3 \cdot \mu^2)$, where h is Planck's constant, c is the speed of light, $\upsilon$ is the frequency of smaser emission, and $\mu$ is the electric dipole moment. The stimulated lifetime is approximately the inverse linewidth of the emitted spectrum of the smaser.

The loss per cm of the gain material in the cavity may be calculated following Troup's scaling-equation for frequency, $Q_L = 2\pi f_0 W/(\text{Total power lost})$, where $Q_L$ is the total load Q of the smaser cavity, $f_o$ is the smaser emission frequency, and W is the peak power [G. Troup, Masers, Methuen, (1959)]. This provides a value of 0.01 per cm loss.

The gain per cm may be calculated based on Yariv's approach [A. Yariv, Quantum Electronics, Wiley, (1989), $3^{rd}$ Edition, page 170], where the gain coefficient $\gamma$ is provided by:

$$\gamma = \frac{\left(N_2 - N_1 \frac{g_2}{g_1}\right)\lambda^2 \eta}{8\pi n^2 t_{spont}} g(\upsilon)$$

where the atom density is $N_2$ (atoms/m$^3$) in level 2 and $N_1$ (atoms/m$^3$) in level 1. The factor $g_2/g_1$ accounts for the degeneracy $g_2$ of level 1. $\lambda$ is the wavelength, $\eta$ is the transition efficiency≈1, n is the refractive index of the material, $t_{spont}$ is the spontaneous lifetime, and $g(\upsilon)$ the linewidth. This provides a value of ~2 per cm. To be conservative, the actual gain per cm is considered to be smaller by a factor of ten, that is, it is ~0.2 per cm.

The mirror reflectivities of the opposing mirrors are taken to be 0.99 and 0.9, respectively, for the mirror receiving the input pump beam, and the mirror outputting the output beam, where the mirrors at positioned at opposing ends of the cylindrical cross-section maser cavity. The smaser cavity is end pumped using optical radiation.

Assuming the Q-switching population parameters discussed earlier, $n_i/n_p=3$, in FIG. 5, with 94% energy utilization in each output pulse, and using the values via Equations 9.3-16 from Yariv, the useful output power is: $P_0 = P (T/(L_i + T))$, where P is the total power emitted by the atomic population due to stimulated emission, T is the mirror transmittance, and $L_i$ is the internal loss factor. The Peak Output Power from Equation 2 is then calculated to be about $1.3 \times 10^8$ Watts, with a pulse-width of time-duration around 7.5 nanoseconds.

The invention has been described in detail with particular reference to preferred embodiments thereof, but it will be understood by those skilled in the art that variations and modifications can be effected within the spirit and scope of the invention.

What is claimed is:

1. A pulsed smaser, comprising:
   at least one optical resonator comprising:
      opposing mirrors;
      a solid state gain medium having a masing frequency in a range of from about 50 GHz to about 1 THz; and a Q-switch, wherein the solid state gain medium and the Q-switch are optically arranged between the opposing mirrors; and an optical pump arranged to provide optical pump power to the solid state gain medium, wherein the optical pump and the Q-switch are configured to generate pulsed masing in the solid state gain medium at the masing frequency at room temperature to provide output electromagnetic radiation at the masing frequency.

2. The smaser of claim 1, wherein the output electromagnetic radiation at the masing frequency has a peak power of about $1\times10^7$ Watts to about $1\times10^9$ Watts with a pulse width time duration of about 7 nanoseconds seconds.

3. The smaser of claim 1, wherein the solid state gain medium comprises at least one material selected from the group consisting of emerald, ruby, sapphire, titania, magnesium tungstate, zinc fluorite and yttrium oxide.

4. The smaser of claim 3, wherein the solid state gain medium is doped with at least one dopant ion from the group consisting of Gd, Cr, Ni, Fe, V and N.

5. The smaser of claim 1, wherein the optical pump comprises a plurality of lasers.

6. The smaser of claim 5, wherein the plurality of lasers comprise at least one of solid lasers, liquid lasers, gas lasers, laser-diodes, or light emitting diodes.

7. The smaser of claim 1, wherein the Q-switch is configured to provide Q-switching or mode-locking such that the output electromagnetic radiation has a pulse time in the pico-second to micro-second range.

8. The smaser of claim 7, wherein the Q-switch comprises a saturable-absorber material.

9. The smaser of claim 8, wherein the saturable-absorber material comprises at least one of graphene, graphane or carbon nano-tubes dispersed in a liquid-crystal.

10. The smaser of claim 1, wherein the output electromagnetic radiation is output in a $TEM_{00}$ mode.

11. The smaser of claim 1, further comprising a cooling element configured to cool the at least one solid state gain medium.

12. The smaser of claim 11, wherein the cooling element is configured to provide air cooling or liquid cooling.

13. The smaser of claim 11, wherein the cooling element comprises one or more heat dissipating fins.

14. The smaser of claim 1, wherein the at least one resonator comprises a plurality of resonators.

15. An optical assembly comprising:
the smaser of claim 1; and
an optical element arranged to receive output electromagnetic radiation from the smaser.

16. The optical assembly of claim 15, wherein the optical element comprises at least one of a lens or mirror arranged to expand and then focus the output electromagnetic radiation.

17. The optical assembly of claim 16 wherein the optical element comprises at least one of an afocal lens or an afocal mirror.

18. The laser of claim 1, wherein the Q-switch comprises at least one of an acousto-optic Q switch, an electro-optic Q switch, a mechanical Q switch, or a passive Q-switch.

19. A continuous wave smaser, comprising:
at least one optical resonator comprising:
opposing mirrors; and
a solid state gain medium having a masing frequency in a range of from about 50 GHz to about 1 THz; and
an optical pump arranged to provide optical pump power to the solid state gain medium,
wherein the optical pump is configured to generate masing in the solid state gain medium at the masing frequency at room temperature to provide output electromagnetic radiation at the masing frequency.

* * * * *